(12) United States Patent
Mujeeb (10) Patent No.: US 10,304,308 B2
(45) Date of Patent: May 28, 2019

(54) TRANSIT WORKER WARNING SYSTEM

(71) Applicant: Numan Mujeeb, Vancouver, WA (US)

(72) Inventor: Numan Mujeeb, Vancouver, WA (US)

( * ) Notice: Subject to any disclaimer, the term of this patent is extended or adjusted under 35 U.S.C. 154(b) by 0 days.

(21) Appl. No.: 15/796,499

(22) Filed: Oct. 27, 2017

(65) Prior Publication Data
US 2018/0122205 A1 May 3, 2018

Related U.S. Application Data (60) Provisional application No. 62/415,683, filed on Nov. 1, 2016.

(51) Int. Cl.
| | |
|---|---|
| G08B 21/02 | (2006.01) |
| A41D 13/01 | (2006.01) |
| A41D 1/00 | (2018.01) |
| B61L 23/06 | (2006.01) |
| A41D 1/04 | (2006.01) |
| G08B 5/00 | (2006.01) |
| H04W 4/021 | (2018.01) |
| H04W 4/02 | (2018.01) |
| H04W 4/40 | (2018.01) |
| G08B 5/36 | (2006.01) |
| H04W 4/04 | (2009.01) |
| H04W 4/80 | (2018.01) |
| G08B 7/06 | (2006.01) |
| G08B 25/00 | (2006.01) |

(52) U.S. Cl.
CPC ............ *G08B 21/02* (2013.01); *A41D 1/002* (2013.01); *A41D 1/04* (2013.01); *A41D 13/01* (2013.01); *B61L 23/06* (2013.01); *G08B 5/004* (2013.01); *G08B 5/006* (2013.01); *H04W 4/021* (2013.01); *H04W 4/023* (2013.01); *H04W 4/40* (2018.02); *G08B 5/36* (2013.01); *G08B 7/06* (2013.01); *G08B 25/009* (2013.01); *H04W 4/027* (2013.01); *H04W 4/046* (2013.01); *H04W 4/80* (2018.02)

(58) Field of Classification Search
CPC ...... B61L 23/06; B61L 25/021; B61L 25/025; B61L 15/0027; B61L 2205/04; G08B 21/02; B60Q 1/26; B60Q 1/2673; B60Q 1/50; B60Q 1/525; B60Q 9/008; B66F 17/003
See application file for complete search history.

(56) References Cited

U.S. PATENT DOCUMENTS

| | | | |
|---|---|---|---|
| 5,999,091 A | 12/1999 | Wortham | |
| 6,232,887 B1 | 5/2001 | Carson | |
| 7,030,777 B1 * | 4/2006 | Nelson | G08G 1/0955 340/907 |
| 2005/0152142 A1 * | 7/2005 | Traynor | A01K 11/00 362/249.01 |

(Continued)

*Primary Examiner* — Orlando Bousono
*Assistant Examiner* — Anthony D Afrifa-Kyei (57) ABSTRACT

The disclosed technology comprises a system to provide warning of a rail or vehicle approaching a work area for a transit worker or group of transit workers. In some implementations, the disclosed technology includes a sensor station that detects rail or vehicles approaching the work area, which transmits a warning signal to a safety vest worn by workers. In some implementations, the safety vest has a transceiver to receive the warning signal and activates an alarm mounted to the vest. The alarm may be a flashing light or a vibration that can be felt by the vest wearer.

19 Claims, 10 Drawing Sheets

(56) References Cited

U.S. PATENT DOCUMENTS

| | | | |
|---|---|---|---|
| 2006/0087443 A1 | 4/2006 | Frederick et al. | |
| 2012/0025964 A1* | 2/2012 | Beggs | B60Q 1/2673 |
| | | | 340/435 |
| 2012/0033411 A1 | 2/2012 | Heo | |
| 2012/0105252 A1* | 5/2012 | Wang | E01F 11/00 |
| | | | 340/936 |
| 2013/0200223 A1* | 8/2013 | Alexander | B61L 29/28 |
| | | | 246/473.1 |
| 2013/0304286 A1* | 11/2013 | Ehrler | B61L 23/06 |
| | | | 701/19 |
| 2014/0104081 A1* | 4/2014 | Cross | G08G 9/00 |
| | | | 340/989 |
| 2016/0075226 A1* | 3/2016 | Biderman | A61G 5/04 |
| | | | 301/6.5 |
| 2016/0280240 A1* | 9/2016 | Carlson | G01S 19/17 |

* cited by examiner

TRANSIT WORKER WARNING SYSTEM

CROSS-REFERENCED APPLICATION

This application claims benefit to U.S. Provisional Patent Application No. 62/415,683, filed Nov. 1, 2016, and titled "Transit Worker Protection System," which is identified in the Application Data Sheet of the present application and hereby incorporated by reference in its entirety under 37 CFR 1.57. If there is a contradiction between the provisional and this application, this application controls.

BACKGROUND

In 2014, fatal work injuries due to transportation incidents were higher—1,891, up from 1,865 in 2013. Transportation incidents accounted for 40 percent of fatal workplace injuries in 2014. Within the transportation event category, roadway incidents constituted 57 percent of the fatal work injury total in 2014. The second largest number of transportation fatalities in 2014 involved pedestrian vehicular incidents (17 percent). Fatalities resulting from pedestrian vehicular incidents were up 6 percent from last year's revised count (313 in 2014 up from 294 in 2013). Rail vehicle incidents also increased in 2014, rising 34 percent to 55 fatal injuries from 41 in 2013. These trends have continued in 2015, 2016, and 2017.

Although there are solutions in place to prevent or reduce incidents, these solutions are ineffective because the number of fatal injuries is still above zero. For example, placing traffic cones in a working area does not prevent inattentive drivers from causing accidents. Further, even though transit workers wear safety vests with bright colors, oncoming vehicles cannot always see these vests. Accordingly, a need exists for technology that overcomes these problems and provides additional benefits.

BRIEF DESCRIPTION OF THE DRAWINGS

The techniques introduced herein may be better understood by referring to the following Detailed Description in conjunction with the accompanying drawings, in which like reference numerals indicate identical or functionally similar elements.

The drawings are not drawn to scale. Similarly, some components or operations may be separated into different blocks or combined into a single block for the purposes of discussion of some of the implementations of the disclosed technology. The disclosed technology is intended to cover all modifications, equivalents, and alternatives falling within the scope of the disclosed technology as defined by the appended claims.

DETAILED DESCRIPTION

The disclosed technology includes a warning system for a transit worker (or workers). In some implementations, the warning system comprises a sensor station including: a sensor mount, a sensor for detecting a vehicle approaching a work area, and a wireless transmitter for transmitting a warning signal in response to detection of the vehicle.

In addition to the sensor station, the disclosed technology can include a safety vest. In some implementations, the safety vest comprises a transceiver configured to receive the warning signal from the wireless transmitter on the sensor station, a light source configured to flash in response to receiving the warning signal from the wireless transmitter. In some implementations, the safety vest can activate a vibrating alarm or output an audio warning signal in response to receiving the warning signal from the wireless transmitter.

The disclosed technology can also communicate with networks to monitor oncoming traffic. For example, the wireless transmitter can receive communication signals from a train network (e.g., to determine when trains will be in the work area), traffic networks, or a global positioning network that tracks the location of vehicles (e.g., trucking network, buses, or other public transportation vehicles). Using the communication signals from these networks, the safety vest can activate or turn on lights for the safety vest to warn transit workers of vehicles in the area or warn vehicles in the area of the transit workers.

As an example, a sensor station mounted on a cone detects a moving vehicle, transmits wirelessly the detection to a safety vest, and activates a light source physically coupled to the safety vest to warn a transit worker wearing the safety vest of an oncoming vehicle as well as warn the driver of the oncoming vehicle. The safety vest can also integrate an actuator to vibrate the vest or a speaker to transmit an alarming sound. In some implementations, the safety vest or sensor station are configured to communicate with a Global Positioning System (GPS) wirelessly communicate with a third party (e.g., a dispatcher, a public safety agency, or emergency agency) to provide location information in the event of an injury.

The disclosed technology has at least one benefit. One benefit of the system is that it solves a technical problem of how to integrate visible warning signals in to a transit working area. For example, the disclosed technology includes custom hardware that can communicate enhance communication between a traffic object (e.g., a cone) and a safety vest worn by a transit worker. Additionally, many accidents occur with a transit worker's back turned away from an impending danger, and the disclosed technology helps in this situation because the light source is positioned on the rear of the safety vest to be highly visible to an approaching vehicle. Also, because some work sites are remote (e.g., 100 miles away from major cities) and the system is portable and wirelessly configured, the disclosed technology protects workers even though there is little infrastructure available in remote locations.

Some terms in this disclosure are defined here. A vehicle is defined as an object configured to transport a person, transport cargo, or move along a track, road, or path. A vehicle can be a train, car, truck, train cart, plane, motorcycle, bicycle, boat, remotely controlled vehicle, or other object configured to move along a track, road, or transportation route. The vehicle can vary in size (e.g., a bicycle or 18-wheeler truck) and be powered differently (e.g., electronically, combustion, wind, magnetically). A work area is defined as construction site, repair site, or area where transit workers congregate. The work area can include the work site and 50 feet away from the area. A traffic object is an object used to inform or warn others about a work area. A traffic object can be a cone, warning tape, chain, or road worker sign (e.g., including digital or electronic signs).

Additionally, a "safety vest" can also be referred to as a jacket, vest, or other clothing item configured to be worn by a transit worker. The safety vest can be configured to fit different size individuals (e.g., with buttons, draw strings, Velcro™, magnetic buttons, or other components to clip or secure clothing). The safety vest and sensor station can be considered protective personal equipment (PPE) for work areas or hazardous areas. The system can also be referred to as a "smart cone" or "smart vest", wherein "smart" refers to the cone or vest having some custom hardware and software for detecting vehicles and warning a transit worker.

Figure 1:
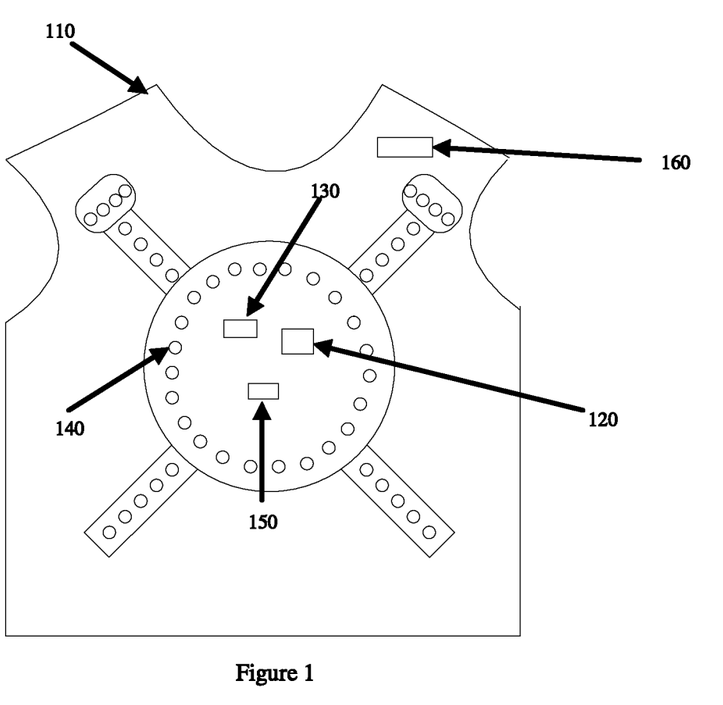
FIG. 1 illustrates a safety vest front view in accordance with some implementations of the disclosed technology.

FIG. 1 illustrates a safety vest front view. The safety vest 110 can include weatherproof fabric, water resistant fabric, material for different weather conditions (e.g., vent for warm or hot weather, insulation for cold or freezing weather). The safety vest 110 can also include soft fabric or durable fabric for working in a tough environment (e.g., a cotton interior and a Gor-tex™ exterior). In one implementation, the front of the safety vest 110 includes an actuator 120 (e.g., configured to vibrate, shake, or move), a wireless module 130 configured to transmit and receive wireless communication signals, a set of light emitting diodes (LEDs) 140 designed to be highly visible by the motorists or oncoming traffic, and a transducer 150 (e.g., speaker), collectively referred to as the components of the safety vest.

The safety vest can have different light patterns based on desired visibility (not shown in FIG. 1). For example, the patterns can be circular, square, or a combination thereof. The LEDs 140 can also be different colors and intensities to increase its visibility. For example, the safety vest 110 can include LEDs that have enough intensity to be seen at least 50 feet away to give oncoming traffic enough time to notice a transit worked wearing the safety and slow down or avoid the transit worker.

In some implementations, the safety vest 110 can have various material or removable parts. For example, the components of the safety vest may be integrated within the material of the safety vest 110, or may be removable (partially or completely). The components can be configured to attach to the safety vest 110 via slots, mechanical supports, Velcro™, or connectors or connecting materials. The safety vest 110 can have metallic slots to enable mechanical support and/or electrical connectivity for safety vest components.

In some implementations the safety vest can include additional components. For example, an S.O.S button may be integrated within the safety vest that may be activated voluntarily by the worker, or automatically once an injury is detected by the safety vest. As another example, the safety vest 110 can include a solar panel 160 to charge during when ultra violet (e.g., sunlight) or other light sources are available. Because transit workers often work in remote locations or forget to charge the safety vests after a long day of work, it can be advantageous to include the solar panel (e.g., photovoltaic cell).

Figure 2:
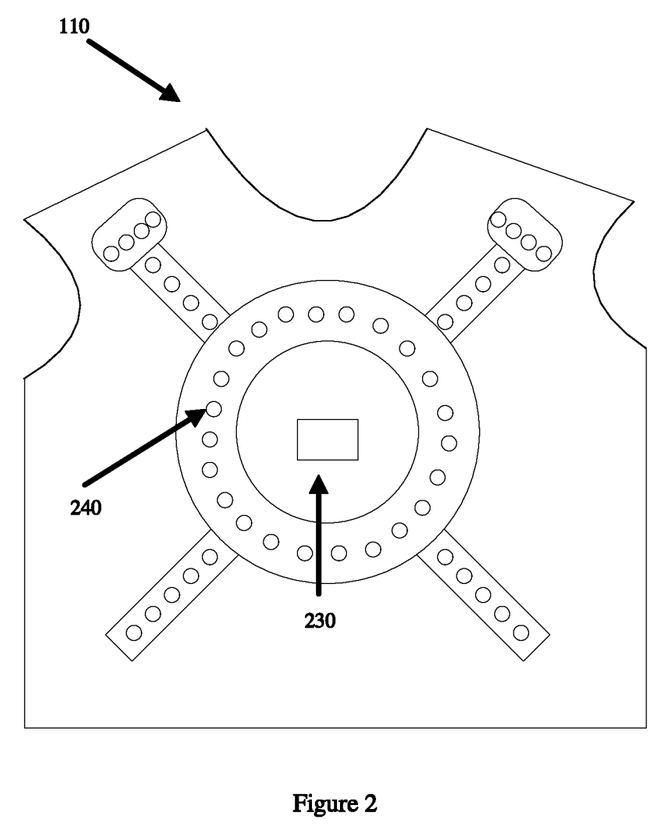
FIG. 2 illustrates a safety vest rear view in accordance with some implementations of the disclosed technology.

FIG. 2 illustrates a safety vest rear view. From the rear view, the safety vest 110 includes a power module 230 which may provide power to the safety vest 110. The power module 230 may be based on a rechargeable or non-rechargeable battery source (e.g., lithium ion, polymer, zinc-carbon, mercury, or other battery chemistry), solar panel, induction, wired, a combination of these, power management circuit, or some other power sources. The power module 230 may be integrated within the fabric or material of the safety vest 110, or may be completely or partially removable. In some implementations, the power module 230 is configured to receive wireless power (e.g., induction, over-the-air with Cota from Ossia™) to charge, which reduces the burden of charging the vest to operation (e.g., if a transit worker forgets or is working long hours). The rear of the safety vest can also include a set of LEDs 240.

The power module 230 may be attached to the rear of the safety vest via slots, mechanical supports, Velcro™, or other connector or connecting material. The rear of the safety vest can be configured to electrically communicate (e.g., wired or wirelessly) to the with the front of the safety vest. In some implementations, switching some or all the components of from the front and to the rear occurs. In some implementations, the safety vest 110 includes a computer-readable storage medium including application-specific, modifiable instructions to cause the microprocessors/microcontroller to perform the methods, variations of the methods, and other functionalities described herein (e.g., FIG. 10). For example, the safety vest 110 can have a repeater algorithm stored in memory, which repeats any warning signals that it received so that other devices (e.g., smart phone, sound system) can receive and output a warning in response to the receiving the repeated safety signal.

Figure 3:
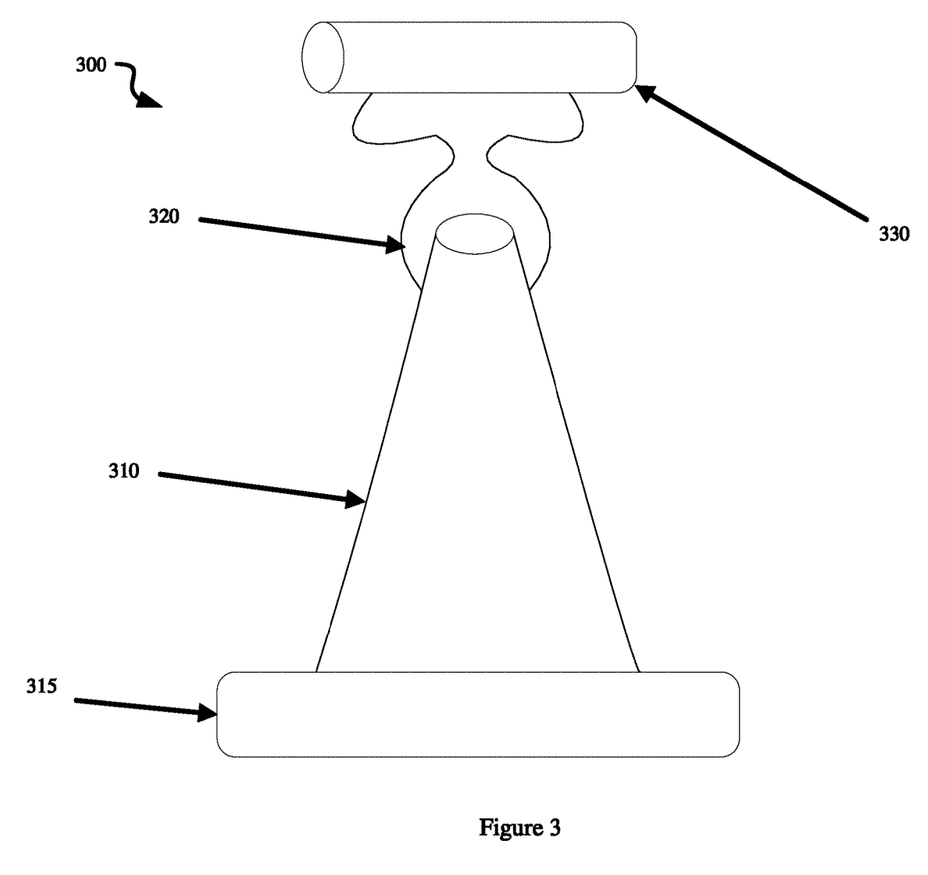
FIG. 3 illustrates a block diagram for a sensor station in accordance with some implementations of the disclosed technology.

FIG. 3 illustrates a block diagram for a sensor station 300. In one implementations, the sensor station has an integrated wireless transmission unit 330 within the body of a cone 310 or configured to attach to the cone 310 through a mounting device 320 (also referred to as a "sensor mount"). In another embodiment, the power circuitry and processing module for the sensor station 300 may be integrated within the base 315 of the cone. The cone 310 may be made of plastic, metal, or other materials. In one implementation, a base 315 of the cone may be covered with a flexible solar panel(s) to provide autonomous power to the circuitries. It should be noted that the cone 310 can have more than one type of connectivity slots that may have different functionality such as providing electrical connectivity and/or mechanical support. The sensor station 330 includes a wireless transmitter 330 that supports a single or multiple frequencies. The connectivity between the base 315 and the wireless transmitter 330 may be wired or wireless. The sensor station 300 may contain other sensors and components that may provide additional functionalities (e.g., camera, motion detector). It may also contain a display and/or buttons that enable a user interactivity (e.g., for parameter settings, maintenance).

Figure 4:
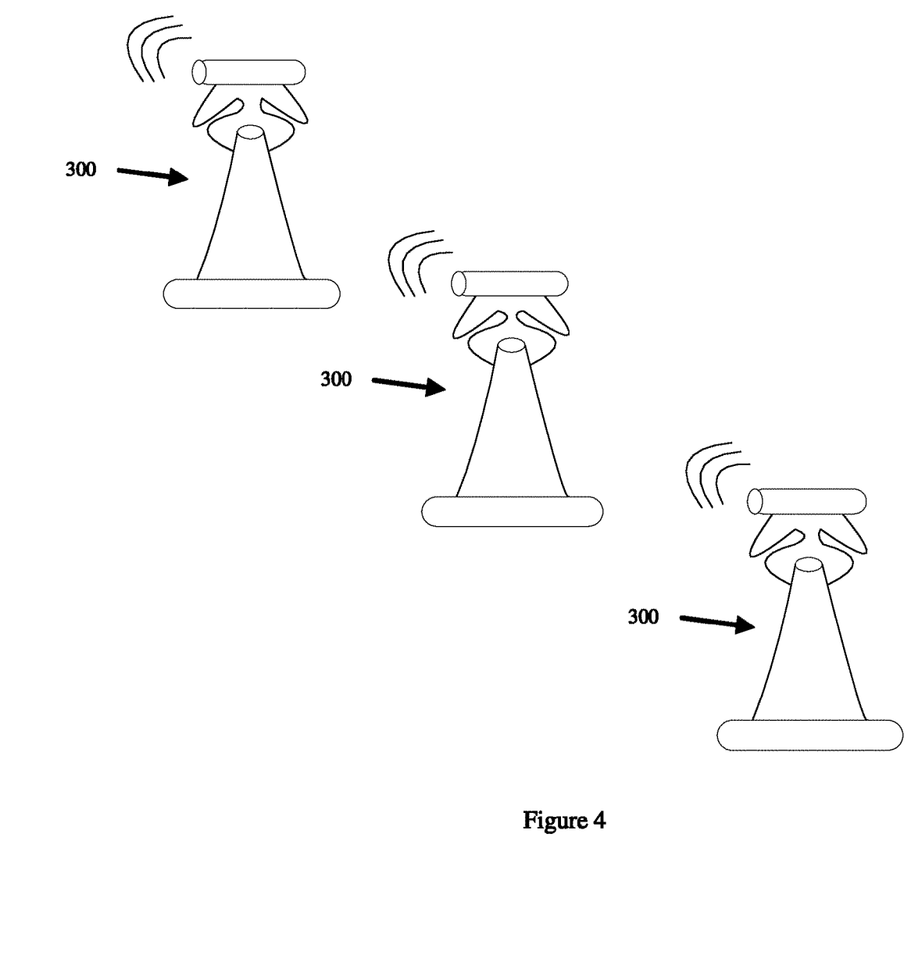
FIG. 4 illustrates a network of adjacent sensor stations in accordance with some implementations of the disclosed technology.

FIG. 4 illustrates a network of adjacent sensor stations 300. The sensor stations 300 are positioned at a distance from each other on a road where a work zone exists.

Configuring the sensor stations in such fashion would be advantageous to relay a warning signal along the sensor stations, which eliminates the need to transmit a high energy wireless signal from sensor station to the worker's safety (e.g., reducing energy or transmission range). Another advantage eliminating false alarms based on confirmation from more than one sensor station of an approaching vehicle. This is done by utilizing the motion sensor information of two or more sensor stations to predict with more certainty a vehicle is detected. The duration of the received signals from the detected object could determine its velocity (e.g., car versus a pedestrian).

Figure 5:
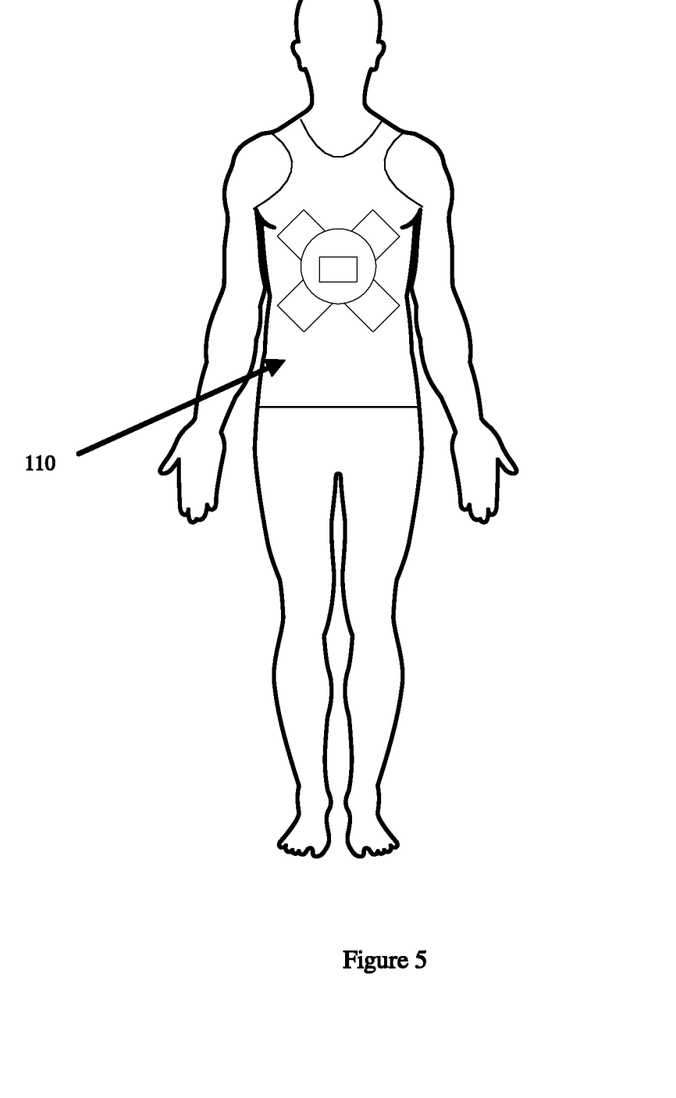
FIG. 5 illustrates a transit worker wearing the safety vest in accordance with some implementations of the disclosed technology.

FIG. 5 illustrates a transit worker wearing the safety vest 110. In one implementation, the safety vest 110 can have different designs and/or equipped with different sensors, modules, or components. Moreover, the vest can be reconfigured and worn in addition to other platforms (e.g., industrial helmet, smart watch, etc.). In another embodiment, the safety vest 110 can be connected to other smart devices (e.g., smart phones, smart fabrics).

Figure 6:
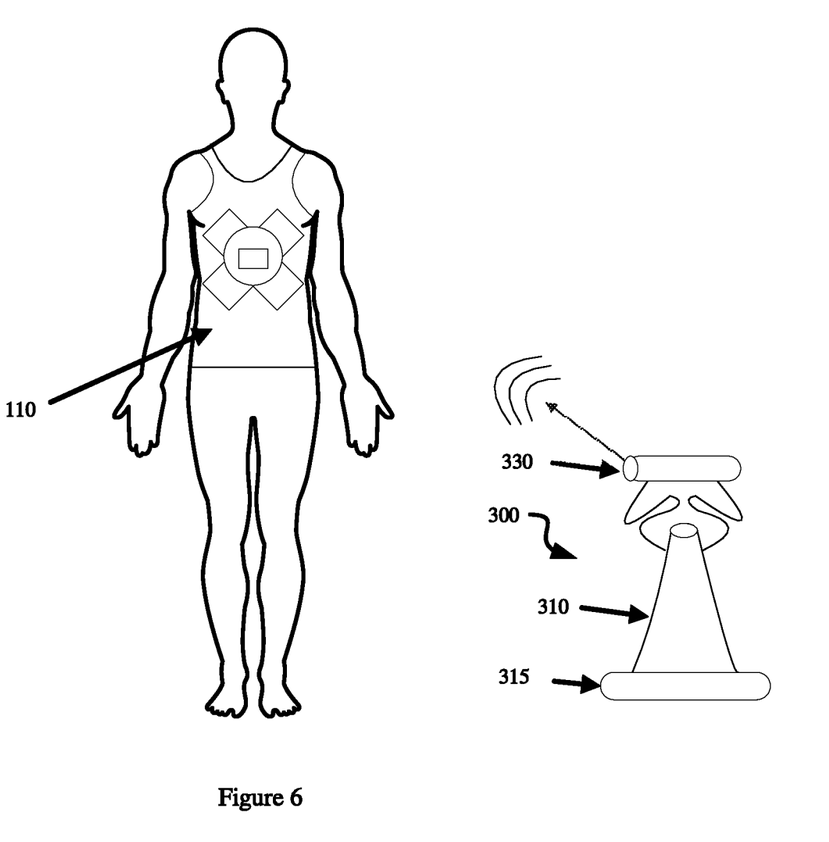
FIG. 6 illustrates a sensor station forwarding a wireless warning signal to a user wearing a safety vest in accordance with some implementations of the disclosed technology.

FIG. 6 illustrates a sensor station forwarding a wireless warning signal to a user wearing a safety vest. The wireless warning signal from the sensor station 300 may have been generated by the transmitter 330 after a motion detector for the sensor station detected vehicle movement. The wireless signal may have been generated by a first sensor station that detected a vehicle's motion, or may have been relayed via several sensor stations.

Figure 7:
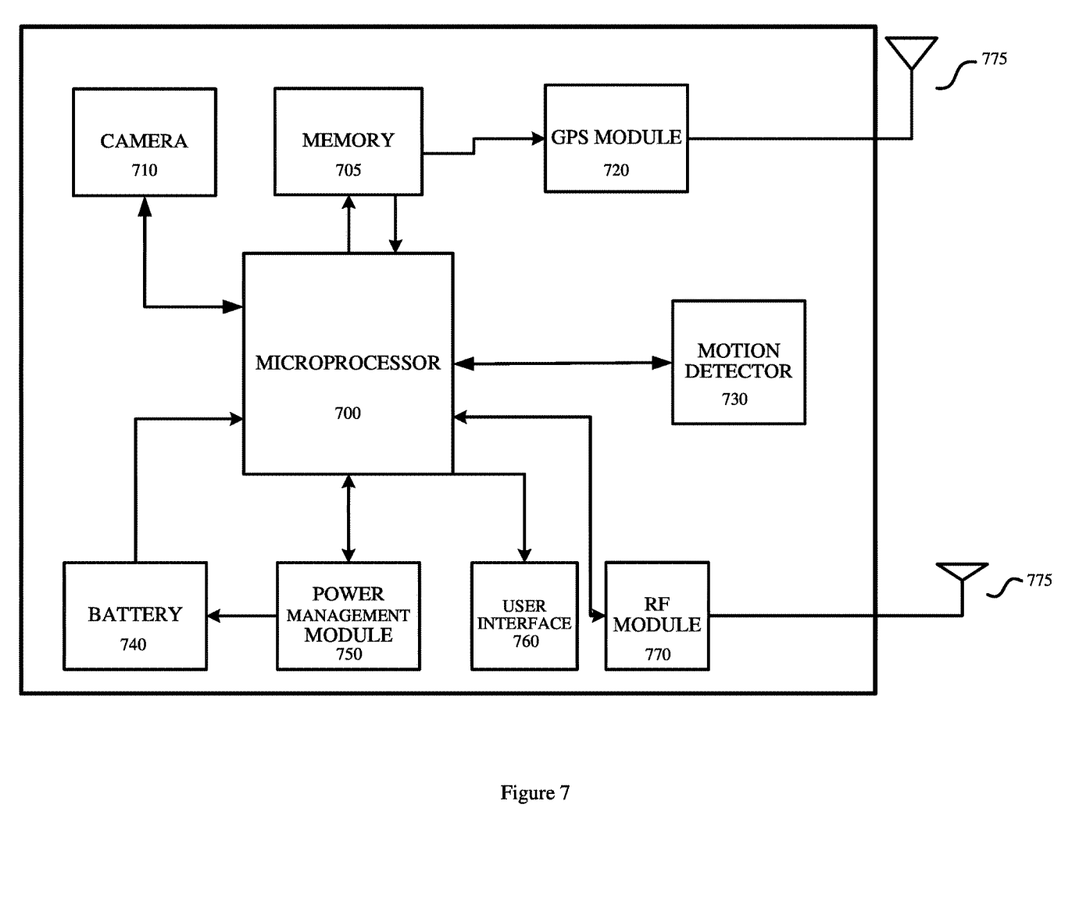
FIG. 7 is a block diagram illustrating sensor station components in accordance with some implementations of the disclosed technology.

FIG. 7 is a block diagram illustrating the components contained in sensor station. A microprocessor 700 acts a central processing unit where several other components are interfaced with it. The microprocessor 700 can be a conventional microprocessor such as one of the Intel™ family processors, AMD™, or Motorola™, a dedicated microcontroller, or a microcomputer. A memory 705 is connected by a bi-directional bus to the microprocessor/microcontroller 700 that can store an operating system and/or certain setup codes. The memory 705 can be a Random Access Memory (RAM), such as Dynamic RAM (DRAM) or Static RAM (SRAM), or a combination of two or more types. The memory 705 can also contain a non-volatile memory which can be a read-only memory (ROM), such as an erasable programmable read-only memory (EPROM), electrically erasable programmable read-only memory (EEPROM). A camera 710 for detecting a moving object (e.g., motion detector) is connected to the microprocessor 700. In some implementations, the camera 710 can be configured to communicate with the microprocessor to perform image recognition to determine a type of object (e.g., train, human, car, bicycle) and the microprocessor can adjust its warning signal based on the processed image.

In some embodiments, a GPS module 720 may be connected to the microprocessor 700 through a bidirectional bus, which may be useful to transmit cone location. The GPS module may have an antenna integrated within or connected to an antenna 775. In one embodiment, a motion detector 730 is possible which may be able to collect more information about the vehicle passing by, than for example, a motion detector. In some implementations, the sensor station can include only a motion detector or only a camera, or both a motion detector and a camera depending on desired accuracy of the sensor station or cost of manufacture.

A power management module 750 is configured to communicate with the microprocessor 700, and to an energy source (e.g., battery 740). Other energy sources such as a solar panel are also possible. A wireless radio frequency (RF) module 770 along with an antenna 775 are used for generating and transmitting the warning signal wirelessly to the safety vest upon detecting a moving vehicle. A user interface (UI) 760 for maintenance and programming purposes may be included in some implementations. For example, a transit work can input information about a job he or she is working (e.g., time, location, number of team members) and can also view information about trains or vehicles in the area.

Figure 8:
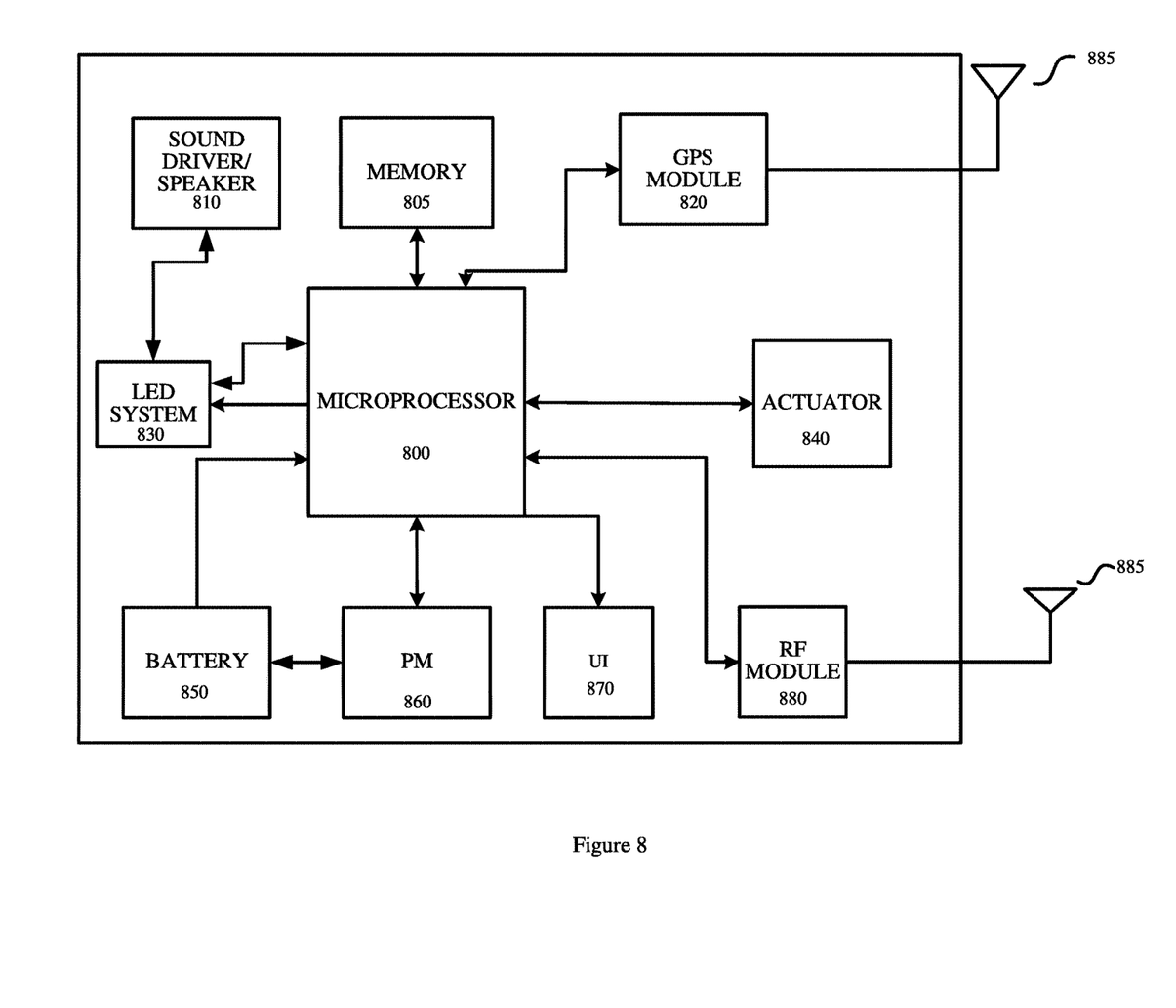
FIG. 8 is a block diagram illustrating safety vest components in accordance with some implementations of the disclosed technology.

FIG. 8 is a block diagram illustrating components of a safety vest. In this embodiment, the microprocessor 800 behaves as a central processing unit (CPU) where several other components configured to communicate with it. The microprocessor 800 may be a conventional microprocessor, a dedicated microcontroller, or a microcomputer. A memory 805 is connected to the microprocessor 800 by a bi-directional bus for storing data and instructions to be processed by the microprocessor 800. The memory 805 may be RAM, such as Dynamic RAM (DRAM) or Static RAM (SRAM), or a combination of any two or more types. A sound driver 810 (e.g., speaker) may be included in some embodiments to produce an alarming sound when a warning signal is received from a cone. A set of LEDs 830, and actuator 840 (e.g., vibrator) are connected to the microprocessor 800. The components 830 and actuator 840 are deployed upon receiving the wireless warning signal from the cone to alarm the worker of an approaching vehicle and to provide visible alarm to the driver through the flashing LEDs. A GPS module 820 may be connected to the microprocessor 800 through a bidirectional bus which may be useful to transmit the worker's location in case of emergency. The GPS module 820 may have an antenna integrated within or connected to an antenna 885.

A power management module 860 is connected to the microprocessor 800, and to an energy source (e.g., battery 850) which is also connected to the microprocessor 800. Other energy sources (e.g., solar panel, thermal energy, etc.) are also possible. A wireless RF module 880 along with an antenna 885 are required for receiving the warning signal from the cone upon detecting a moving vehicle. A user interface (UI) 870 for maintenance and programming purposes may be included in some implementations.

Figure 9:
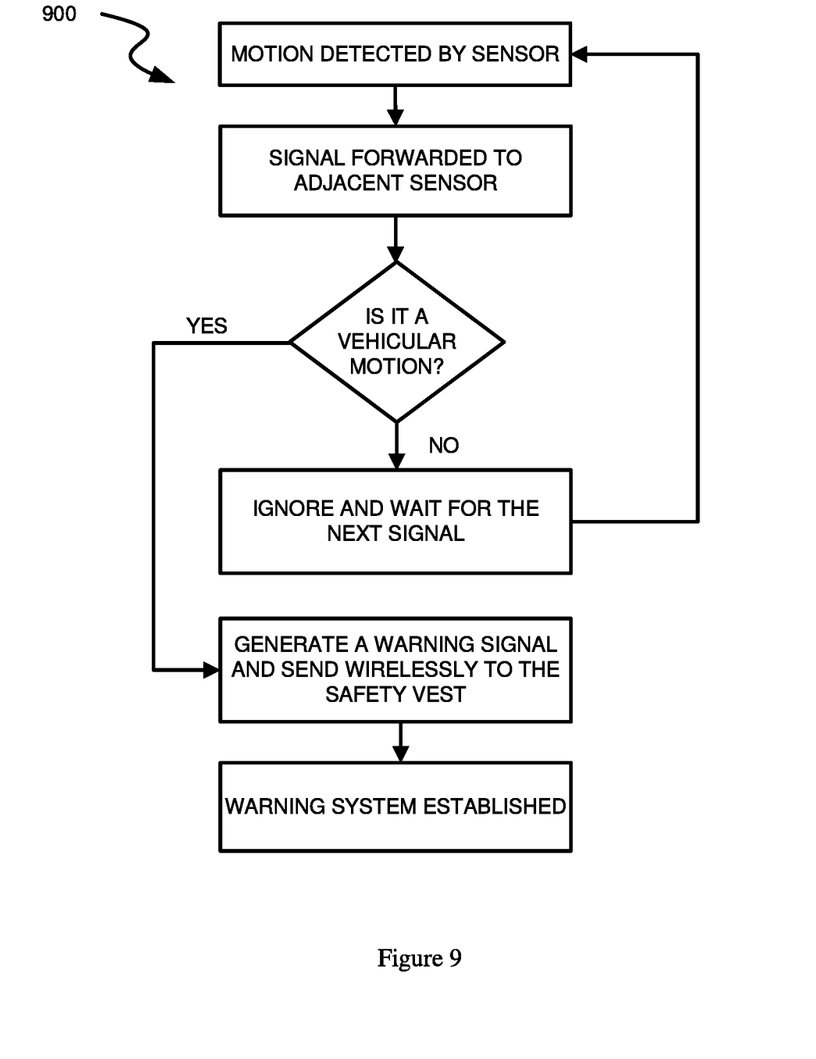
FIG. 9 illustrates a flow diagram for a process to provide a warning signal in accordance with some implementations of the disclosed technology.

FIG. 9 illustrates a flow diagram for a process 900 to provide a warning signal. The process begins when a vehicle (e.g., car, train, truck) passes by a sensor station which sets the boundary of work area. In one embodiment, a warning signal is generated and transmitted wirelessly to the vest once a motion is detected by a sensor stations motion detector. In the embodiment described in FIG. 9, a warning signal is transmitted only when a vehicular motion is detected. This could be done by utilizing a set of sensor stations (e.g., two or more) where the motion detector information is used to determine if the moving object is a vehicle. The duration it takes to receive signals from the detected object by two or more sensor stations could determine its velocity, (e.g., car versus a pedestrian). It should also be noted that any type of motion sensors could be used (e.g., infrared, microwave, ultrasonic). Once a vehicular motion is confirmed, the microprocessor generates a signal which is sent wirelessly by a RF wireless communication module to the vest system which in turn establishes the alarm system (e.g., flashing LEDs, sounds, vibration).

Figure 10:
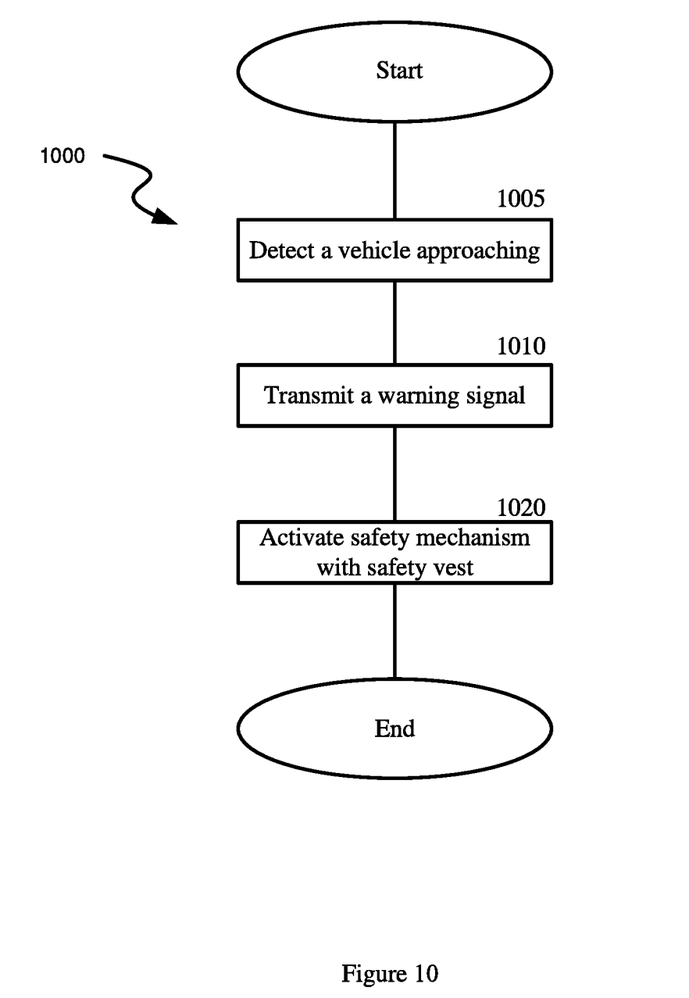
FIG. 10 illustrates a flow diagram for a process to warn transit workers of an approaching vehicle in accordance with some implementations of the disclosed technology.

FIG. 10 illustrates a flow diagram for a process 1000 to warn transit workers of an approaching vehicle. A mobile phone, computing device, transit system, or cone can start the process 1000. The process 1000 generally includes detecting an oncoming vehicle and transmitting a warning signal to a safety vest. The safety vest receives the warning signal and activates a safety mechanism. A safety mechanism can be turning on or activating lights on the vest, vibrating the vest, outputting a sound at the vest, or a combination thereof. The safety mechanism is intended to alert a transit work wearing the vest of a potential oncoming vehicle or warn the oncoming vehicle about the transit worker.

At detection operation 1005, a computer device detects a vehicle is approaching a transit worker area. For example, a sensor station mounted on top of a cone detects the motion of a train, car, or other vehicle. The computer device can also be connected to a railway network or wireless communication network to receive a signal that a train, truck, or bus is arriving or will be arriving soon at a transit worker area. The computer device can use both motion detection and wireless communication or it can use a signal method. In some implementations, the computer device can also sense other information about the oncoming vehicle such as velocity, speed, location, or visual appearance (e.g., take a picture). This additional information can be transmitted with or after transmitting the wireless signal. Also, in some implementations, a work area has multiple sensor stations spaced apart. The sensor station closer to an oncoming vehicle can first detect a vehicle and send this signal to another sensor station. The sensor stations can behave as a chain of sensor stations (e.g., first sensor station, second sensor station, third sensor station), wherein the chain can communicate information about the oncoming vehicle such as when and where it was detected.

At transmit operation 1010, a transmitter transmits a warning signal to a safety vest worn by a transit worker. For example, using the systems described in FIGS. 7 and 8, a cone system can transmit a warning signal to a safety vest, where the safety vest has a wireless receiver to receive the signal and a processor to process the signal.

At activating operation 1020, a safety vest activates a safety mechanism. A safety mechanism can be signal, gesture, or warning that increases safety. For example, the safety vest can activate a light pattern to notify the vest user and oncoming traffic (or a bystander, who can also warn others) that an oncoming traffic has been detected. Another safety mechanism can be vibration of the vest or a sound emitted from the vest. In some implementations, the safety vest uses safety mechanisms concurrently such as flashing lights, vibrating, and making a sound.

CONCLUSION

While a few implementations are disclosed herein, several other implementations of the disclosed technology would be clearly envisioned by those skilled in the art from the detailed description. The disclosed technology can be modified in various aspects, all without departing from the scope of the disclosed technology. For example, the warning system can be used in an underwater operation to protect workers under water. In such an implementation, the wireless transmitter would transmit signals at frequencies that can transmitting or received under water (e.g., at least at short distances) and the vests would be configured to fit on scuba diving gear.

Reference in this specification to "one implementation" or "an implementation" means that a feature, structure, or characteristic described in connection with the implementation is included in at least one implementation of the disclosure. The appearances of the phrase "in one implementation" in various places in the specification are not necessarily all referring to the same implementation, nor are separate or alternative implementations or embodiments mutually exclusive of other embodiments. Moreover, various features are described that can be exhibited by some embodiments and not by others. Similarly, various requirements are described which may be requirements for some implementations but no other implementations.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Machine-readable medium can include non-transitory computer-readable medium storing instructions that when executed by a processor cause a computing device to perform operations (e.g., an algorithm for detecting a vehicle).

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various implementations given in this specification.

What is claimed is:
1. A warning system, the warning system comprising:
a first sensor station, wherein the first sensor station comprises:
a sensor mount configured to mount the sensor station to a portable traffic object,
wherein the portable traffic object is configured to visually warn others of a work area;
a motion sensor for detecting a vehicle approaching the work area; and
a wireless transmitter configured to transmit a signal in response to detection of the vehicle; and
a safety vest, wherein the safety vest comprises:
a transceiver configured to receive a warning signal from the first sensor station; and a first light source and second light source configured to transmit light in response to receiving the warning signal, wherein the first light source is located on the front of the safety vest and the second light source is located on the back of the safety vest;

a second and third sensor station, wherein the second and third sensor stations are identical to the first sensor station, and wherein the first, second, and third sensor stations are configured to communicate with each other using a wireless communication protocol, wherein the second sensor station is configured to transmit a second signal in response to detection of the vehicle;

wherein the third sensor station is configured to transmit a third signal in response to detection of the vehicle;

wherein the first, second, and third sensor stations are configured to verify that the vehicle is approaching the safety vest based on the first, second, or third signal and communicating using the wireless communication protocol between the sensor stations; and wherein the first, second, and third sensor stations are configured to reduce false alarms related to the vehicle approaching the work area based on communications between the sensor stations or based on wireless communication with a centralized traffic system.

2. The warning system of claim 1, wherein the safety vest further comprises water resistant material.

3. The warning system of claim 1, wherein the safety vest further comprises: an actuator configured to vibrate in response to receiving the warning signal; and wherein the safety vest is configured to be worn over a jacket.

4. The warning system of claim 1, wherein the first and second light sources further comprise:
at least 10 light emitting diodes arranged in a pattern configured to be visible to an approaching vehicle at least 50 feet away.

5. The warning system of claim 1, wherein the safety vest further comprises: a solar panel configured to provide power to the safety vest or a battery physically coupled to the safety vest.

6. The warning system of claim 1, wherein each sensor station is configured to charge or operate using wireless power.

7. The warning system of claim 1, wherein the portable traffic object is at least one of the following:
a cone;
a sign;
warning tape;
a warning fence; or
any combination thereof.

8. The warning system of claim 1, wherein each sensor station is configured to use at least one of the following wireless communication protocols:
Bluetooth;
ZigBee;
Bluetooth Low Energy;
Wi-Fi;
Third Generation (3G), Fourth Generation (4G), Fifth Generation (5G), Code Division Multiple Access (CDMA), Global System for Mobiles (GSM), or other cellular communication standard; or
proprietary wireless communication protocol for transmit work vehicles.

9. The warning system of claim 1, wherein the wireless transmitter is further configured to:
receive wireless communication signals from a global positioning network;
receive wireless communication signals from a train network;
receive wireless communication from a cellular network; and
communicate received wireless communication signals to a mobile device for a transit worker wearing the safety vest.

10. The warning system of claim 1, wherein each sensor station is spaced at least 30 feet apart from the other sensor stations.

11. The warning system of claim 7, wherein the portable traffic object is a cone, and wherein the sensor station is configured to attach to the cone with a clip, flange, or insert.

12. A method to provide a warning to a transit worker, the method comprising:
detecting, at a first sensor station, a first signal that indicates a vehicle is approaching a transit worker area, wherein the sensor station is configured to mount to a portable traffic object,
wherein the portable traffic object is configured to visually warn others of the transit work area;
verifying, at a second or third sensor station, that the vehicle is approaching a transit worker wearing a transit safety vest based on detecting a second signal that also indicates the vehicle is approaching the transmit worker area and communicating using a wireless communication protocol between the sensor stations;
transmitting, by the first, second, or third sensor station, a warning signal to the transit safety vest worn by the transit worker; and
activating lights on the transit safety vest in a pattern to make the vest visible to the approaching vehicle, wherein the lights are located on the front and back of the transit safety vest.

13. The method of claim 12, wherein detecting the vehicle is approaching further comprises:
receiving a repeated warning signal from another sensor station, wherein the sensor station is configured to be attached to the portable traffic object.

14. The method of claim 12, wherein detecting the vehicle is approaching further comprises:
receiving a wireless communication signal from a train system,
wherein the vehicle is a train, and
wherein the wireless communication signal includes location of the train and estimated speed of train; and
determining that the vehicle is approaching an area where the transit worker is location at least partially based on the received wireless communication signal.

15. The method of claim 12, the method further comprising:
transmitting the warning signal to other sensor stations and other safety vests in the transit area; and
transmitting the warning signal to a central system to communicate the warning to a transit worker coordination center.

16. A non-transitory computer-readable medium storing instructions that when executed by a processor cause a device to perform operations to warn a transit worker, the operations comprising:
detecting, at a first sensor station, a vehicle is approaching a transit worker area, wherein the sensor station is configured to mount to a portable traffic object,
wherein the portable traffic object is configured to visually warn others of the transit work area;
verifying, at a second or third sensor station, that the vehicle is approaching a transit worker wearing a transit safety vest based on detecting a second signal that also indicates the vehicle is approaching the transmit worker area and communicating using a wireless communication protocol between the sensor stations;
transmitting, by the first, second, or third sensor station, a warning signal to the transit safety vest worn by the transit worker; and
activating lights on the transit safety vest in a pattern to make the vest visible to the approaching vehicle, wherein the lights are located on the front and back of the transit safety vest.

17. The non-transitory computer-readable medium of claim 16, wherein the receiving a repeated warning signal from another sensor station, wherein the sensor station is configured to be attached to the portable traffic object.

18. The non-transitory computer-readable medium of claim 16, wherein the operations further comprises:
receiving a wireless communication signal from a train system,
wherein the vehicle is a train, and
wherein the wireless communication signal includes location of the train and estimated speed of train; and
determining that the vehicle is approaching an area where the transit worker is location at least partially based on the received wireless communication signal.

19. The non-transitory computer-readable medium of claim 16, wherein the operations further comprise:
transmitting the warning signal to other sensor stations and other safety vests in the transit area; and
transmitting the warning signal to a central system to communicate the warning to a transit worker coordination center.

* * * * *